US011892102B2

(12) United States Patent
Shiau et al.

(10) Patent No.: US 11,892,102 B2
(45) Date of Patent: Feb. 6, 2024

(54) CONDUIT CONSTRUCTION LINE AND GRADE SETTER

(71) Applicants: Shi-En Shiau, Scottsdale, AZ (US); Brian Chia-Huan Shiau, Scottsdale, AZ (US)

(72) Inventors: Shi-En Shiau, Scottsdale, AZ (US); Brian Chia-Huan Shiau, Scottsdale, AZ (US)

(*) Notice: Subject to any disclaimer, the term of this patent is extended or adjusted under 35 U.S.C. 154(b) by 0 days.

(21) Appl. No.: 17/755,668

(22) PCT Filed: Dec. 17, 2021

(86) PCT No.: PCT/US2021/063975
§ 371 (c)(1),
(2) Date: May 4, 2022

(87) PCT Pub. No.: WO2022/140171
PCT Pub. Date: Jun. 30, 2022

(65) Prior Publication Data
US 2023/0194019 A1    Jun. 22, 2023

Related U.S. Application Data (60) Provisional application No. 63/205,518, filed on Dec. 21, 2020.

(51) Int. Cl.
*F16L 1/06* (2006.01)

(52) U.S. Cl.
CPC ..................................... *F16L 1/06* (2013.01)

(58) Field of Classification Search
CPC ........ F16L 1/06; F16L 1/10; F16L 1/09; F16L 1/11; F16L 1/032; F16L 1/036;
(Continued)

(56) References Cited

U.S. PATENT DOCUMENTS

| 3,631,601 A | | 1/1972 | McNulty |
| 3,879,132 A | * | 4/1975 | Myeress ............... G01C 15/002 33/1 H |

(Continued)

OTHER PUBLICATIONS

Harry Kim, International Search Report and Written Opinion, PCT application PCT/US/2021/063975 (dated Mar. 1, 2022).

*Primary Examiner* — Carib A Oquendo
(74) *Attorney, Agent, or Firm* — Venjuris, P.C.

(57) ABSTRACT

The invention is embodied in a construction quality control tool that allows owners and contractors to meet design plans and specifications. It saves time and costs to both parties' budgets by easily measuring pipe grading while eliminating need for surveyors on site and quickly transmitting print data in real time for third-party inspectors to prepare as-built plans. Most importantly, it ensures pipes are installed safely and accurately to prevent construction issues in the future. The preferred embodiment of the invention comprises two devices: (1) a pipe setter and (2) a remote processing and recording unit. The pipe setter is mounted inside the new pipe to be installed. The pipe setter helps the pipe installer reliably and accurately install pipe that matches the line and grade (fixed x, y z) per design plan. The remote processing and recording unit enables the construction superintendent and the third-party inspector monitoring the pipe installation in real time.

8 Claims, 10 Drawing Sheets

(58) Field of Classification Search
CPC .... G01C 15/00; G01C 15/002; G01C 15/008; G01C 15/10; E03F 3/06
See application file for complete search history.

(56) References Cited

U.S. PATENT DOCUMENTS

| | | | |
|---|---|---|---|
| 4,043,679 A | 8/1977 | George et al. |
| 4,209,269 A | 6/1980 | Martinez |
| 5,465,493 A | 11/1995 | Sobottke et al. |

* cited by examiner

Figure 1 – pipe installation

Fig. 1A – (101) braced deep trench

Fig 1B - (102) backhoe digging and moving trench boxes.

Fig. 1C - (103) Three Trench Boxes stacked

Fig. 1D - (104) pipe joiner tool

Fig. 1E - (105) power pipe pusher

Fig. 1F - (106) - use a backhoe to lift the pipe and place it in the trench and push the pipe for joining pipes.

Figure 2 – PVC pipe deflections

Fig. 2A - (201) PVC pipe deflection at joint

Fig. 2B - (202) PVC pipe flexible longitudinal deflection

Figure 3 – Prior art – single laser guiding pipe installation by best effort.

Figure 5 – An illustration of the invention application

Figure 6 - An illustration of a two-chamber tube mounted on a center hull

Figure 7 - An illustration of a mounted two-chamber tube

Figure 8 – A cross section illustration of a two-chamber tube mounted on the center hull Section A-A Figure 9 - A top view illustration of the electronic compartment Figure 10 - A cross section view illustration of the electronic compartment Figure 11 - An illustration of a two-pieces mounting hull for smaller pipes

Fig. 11A

Fig. 11B, View B-B

Figure 12 - An illustration of a three-pieces extendable mounting hull for mid-size pipes

Figure 13 - An illustration of a two-pieces extendable mounting hull for large pipes.

Fig. 13A, View C-C

Figure 14 - An illustration of 2-chamber tube mounting accessories

Fig. 14A - 54 360° Bearing

Fig. 14B - 38 shaft (half threaded and half plain)

Fig. 14C - 54 Curved level vial

Figure 15 - An illustration of pipe bell and rubber seal

Fig. 15A - 1501 PVC pipe bell and rubber seal

Fig. 15B - 1502 PVC pipe bell and rubber seal joining a plain end pipe (spigot)

Figure 16 - An illustration of mounting hull accessories

Fig. 16A - 1601 180° torsion spring

Fig. 16B - 1602 180° torsion spring bending illustration

Fig. 16C - 1603 threaded locking bolts

Fig. 16D - 1604 plain end locking bolts

Fig. 16E - 1605 double torsion spring bolts

Fig. 16F - 1606 adjustable bracket

Figure 17 - A section view of an embodiment of the pipe setter.

Figure 18 - An end view of an embodiment of the pipe setter in an unconfined state.

Figure 19 - A side view of the preferred three-piece mounting hull with bellow suction cup and handle

CONDUIT CONSTRUCTION LINE AND GRADE SETTER

FIELD OF THE INVENTION

The present invention relates to setting line and grade for underground pipes. More specifically, this invention relates an improved system and devices for setting the line and grade for underground pipes that match the design plan.

BACKGROUND

A construction project normally involves four parties: owner, contractor, engineer, and third-party independent inspector. Construction of underground conduits must meet the design plans and specifications prepared by engineers.

Typically, once the ground surface has been cleared, the contractor dispatches his surveyor to field stake the ground according to the design plan. The contractor's surveyor stakes the ground offsetting the conduits per instruction as shown on the design plans ("offset stakes"), the contractor can then properly excavate the site along the designated conduit alignment.

A typical survey for the gravity conduit installation requires a high degree of accuracy. For example, flowline station staking at ±0.2 feet, alignment at ±0.1 feet, elevation at ±0.01 feet for every 25' along a tangent and 10' along a curve.

Open trench construction is a common practice for conduit installation, particularly in wide-open, undeveloped areas. Construction in well-developed and/or developing areas requires minimal construction impact. The trenches that are dug to place the conduit are normally the width of the conduit's outside diameter plus one foot to each side of the conduit. Therefore, deep and narrow trenches are most desirable. This type of construction makes it more difficult and time consuming to achieve the accurate conduit installation because the contractor must use trench boxes and/or other bracing equipment for safe construction of deep and narrow trenches (FIG. 1, 101).

Conduits made of concrete and metals (except special corrosion resistant stainless-steel alloy) that convey wastewater are vulnerable to corrosion by hydrogen sulfide gas that arises from septic biological waste carried in the wastewater. As a result, PVC and HDPE are the preferred material for pipes due to their ability to withstand corrosion from hydrogen sulfide gas. Likewise, concrete pipes coated with PVC lining, steel pipe lining with epoxy coatings, and clay pipe are also used for conveying wastewater. PVC and HDPE are flexible pipes that are subject to deformation if installed improperly. Nonetheless, low-cost PVC pipes are the most widely used in sewer line installation.

To construct and install a conduit, the contractor's surveyor first stakes the ground at offsets to the conduits as shown on the design plans for the contractor to excavate along the designated conduit alignment with a backhoe and to move the trench box simultaneously (102). Trench boxes are available in a few sizes that are limited by the weight and the specific depth of the trench. For a 30-foot-deep trench, three trench boxes must be stacked vertically (103).

Digging, lowering, and stacking trench boxes are concurrent operations. After digging a trench to the depth set by the offset staking, pipes are installed at the designed elevation and a layer of bedding material is placed and compacted to the pipe spring line elevation (about half the pipe diameter).

In this process, the contractor's surveyor and a third-party surveyor should measure each laid pipe invert immediately after a layer of bedding material is placed and compacted to the pipe spring line elevation before layers of compacted soil fill the trench and cover the conduit.

Figure 1A:
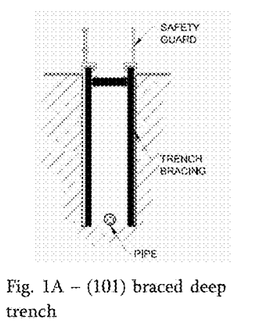
FIG. 1—Prior Art—pipe installation.
Figure 1B:
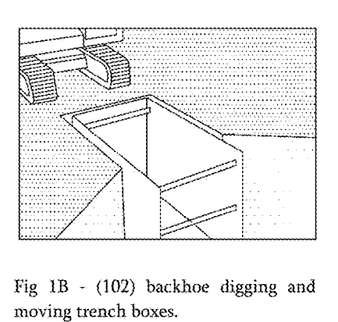
Figure 1C:
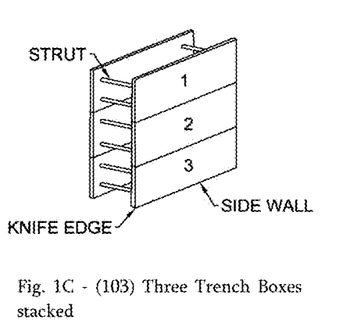
Figure 1D:
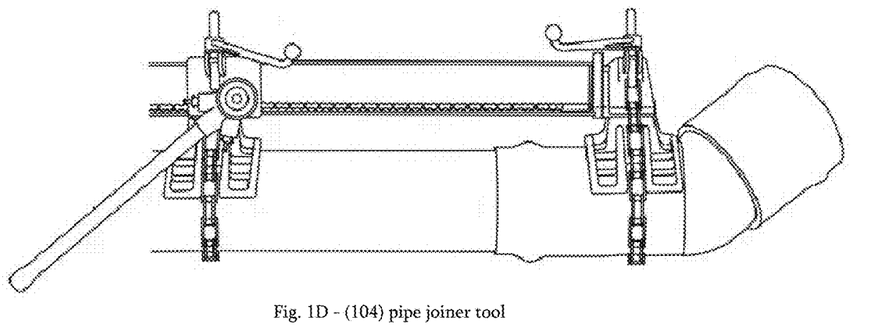
Figure 1E:
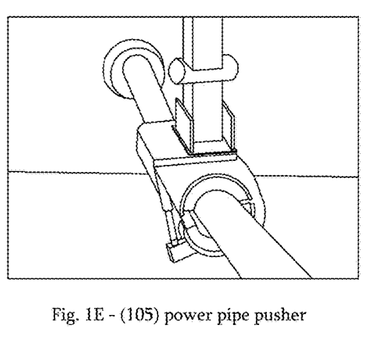
Figure 1F:
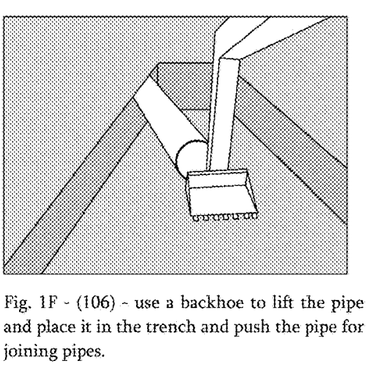
Figures 2A, 2B:
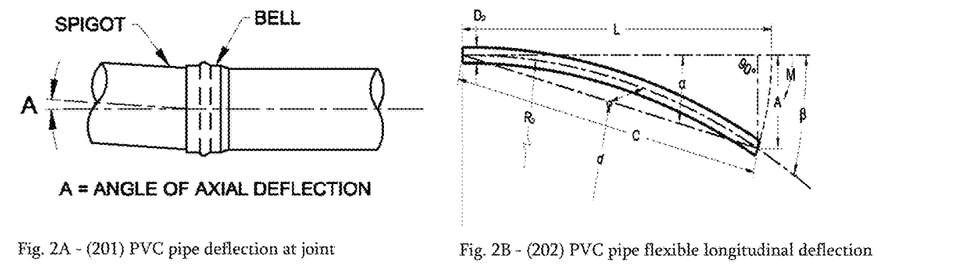
FIG. 2—illustrates PVC pipe deflections.

Without checking the line and grade immediately after each new pipe (20' long) is installed, erroneous placed pipes can result finished lines in a pattern of up and down and zigzag due to the nature of the flexible pipes like PVC. Even the most experienced installers may install pipes deviated from the design plan due to (1) PVC pipe deflection at the joint (FIGS. 2, 201) and (2) PVC pipe flexible longitudinal deflection (FIG. 2, 202). For example, pipe joints are flexible for up to 5° deflections. When two pieces of pipe are joined, the flexibility can result up to 8% gradient deviations in 360° directions. A 1% gradient deviation can result in up to 2.4" elevation deviation in a 20' long new pipe installation.

Performing the measurements of validating of every pipe installed has major impact to the construction cost and schedule.

The construction cost increase comes primarily from needing a survey crew on site to measure each pipe invert, and for delays to the contractor's pipe installer by having to pause work to allow the surveyor to take measurements. Not only does this slow down installation, but this also requires the contractor's survey crew to be always on-site. Most contractors cannot afford the cost of a standby survey crew with the project budget. Consequently, contractors take a risk and rely on the pipe installer to make a better effort with/without a laser pointer at laying the pipe according to the offset staking. This is often done without taking measurements after each pipe is laid down to confirm that the pipe's alignment, grade, and other characteristics conform to the design plans.

The project schedule is prolonged from the practice of a third-party inspector verifying the as-built documentation on every pipe section that is installed after a surveyor takes a measurement or, at a minimum, after a pipe installer lays down the pipe. Use of a third-party inspector increases construction timeline and significantly reduces the contractor's daily output.

As a result, the inspection of the conduit as built is typically not performed on each pipe installed and often only performed at fixed elevation manholes, which has minimal to no impact on the intermediate pipe construction. A sewer line if constructed slightly downward or upward can impair the flow characteristics against the conduit designed.

When contractors suspect such an impairment has occurred, many contractors rarely remove the installed conduit to reinstall the pipe at the correct grade and angle. Instead, many contractors often adjust the angle or the grade of the remaining pipe to be installed so that it will connect with the next manhole at the correct elevation and location. This results in a conduit of incorrect grades with convexity or concavity that will accumulate waste deposits. At best, this requires frequent and expensive cleaning and maintenance, at worst, it can result in backed up service for the end users and surges at manholes.

Most pipe manufactures recommend that contractors use a pipe joiner tool (FIG. 1, 104) to join pipes at the factory reference mark.

For lifting and joining large diameter pipes, contractors may use a power pipe pusher (FIG. 1, 105). However, to save dollars and time, contractors may simply use a backhoe (106) to lift and place the pipe in the trench and to push the pipe into another pipe for joining pipes, another practice that may result misaligned pipe installation.

Figure 3:
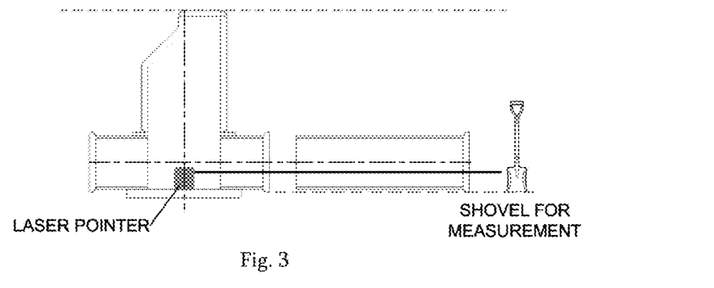
FIG. 3—Prior Art—single laser single laser guiding pipe installation by best effort.

Today, the use of laser beam (FIG. 3) set the pipe grade has gained popularity. The laser beam diverges as the distance to target increases. Beam divergence is defined as the angular measure of how the beam diameter increases with the distance from the laser aperture. It is measured in milliradians (mrad) or degrees(°) Simply put, it tells you how the beam grows from the source to the target, which the practice of using laser beams for accurate grade setting is heavily relying on the skill and the diligence of the pipe installers. Nonetheless, the degrees of accurate pipe laying decreases as the new pipe parting away from the source beam.

Quality control of alignment and grade on each pipe installed is critical to flexible material (PVC) gravity sewers. Sewer lines constructed with downward-upward misalignments between the manholes can impair the flow of the conduit. At best, this requires frequent and expensive cleaning and maintenance, at worst, it can result in backed up service for the end user and surges at manholes.

SUMMARY OF INVENTION

The invention is embodied in a construction quality control tool that allows owners and contractors to meet design plans and specifications. It saves time and costs to both parties' budgets by easily measuring pipe grading while eliminating need for surveyors on site and quickly transmitting print data in real time for third-party inspectors to prepare as-built plans. Most importantly, it ensures pipes are installed safely and accurately to prevent construction issues in the future.

The preferred embodiment of the invention comprises two devices: (1) a pipe setter and (2) a remote processing and recording unit. The pipe setter is mounted inside the new pipe to be installed. The pipe setter helps the pipe installer reliably and accurately install pipe that matches the line and grade (fixed x, y z) per design plan. The remote processing and recording unit enables the construction superintendent and the third-party inspector to monitor the pipe installation in real time.

Figure 17:
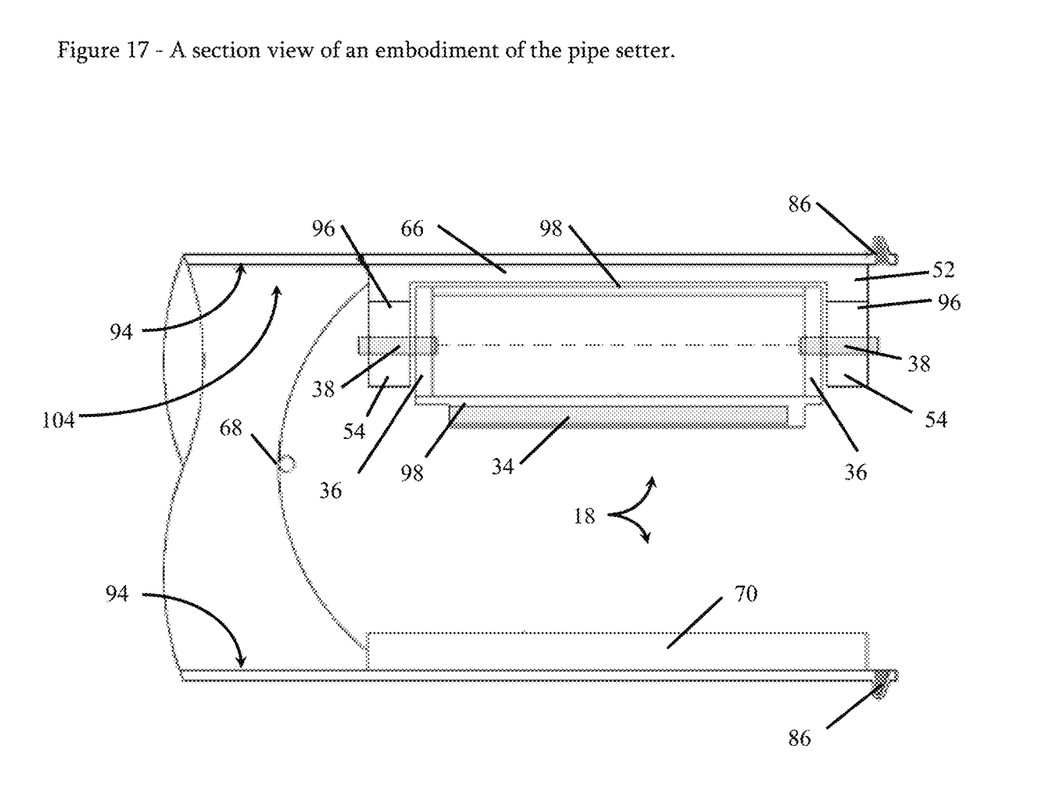
FIG. 17—illustrates a section view of an embodiment of the pipe setter.
Figure 18:
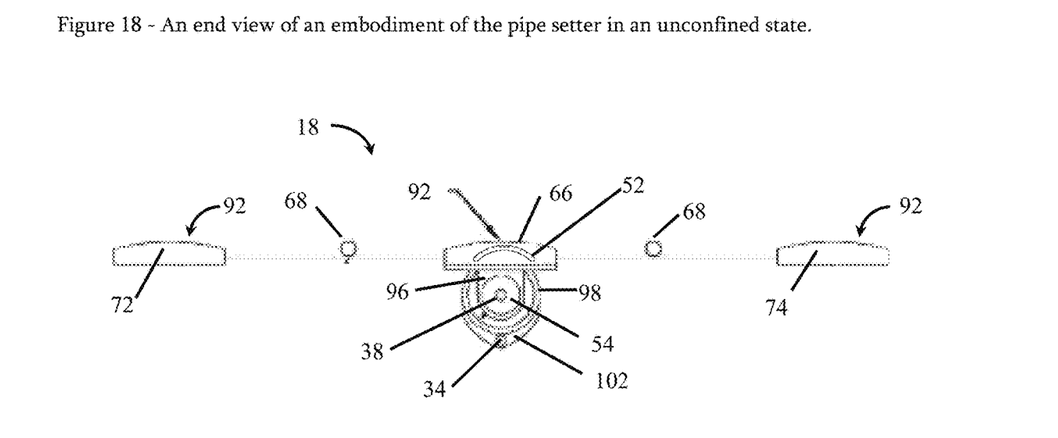
FIG. 18—illustrates an end view of an embodiment of the pipe setter in an unconfined state.
Figure 19A:
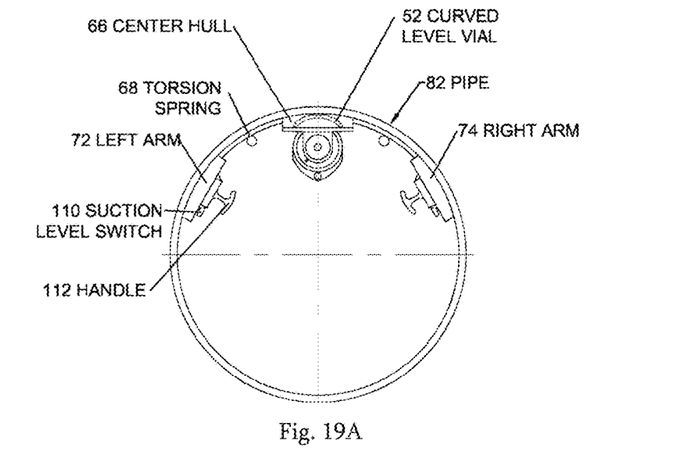
FIG. 19A—illustrates a side view of the preferred three-piece mounting hull with bellow suction cup and handle.
Figure 19B:
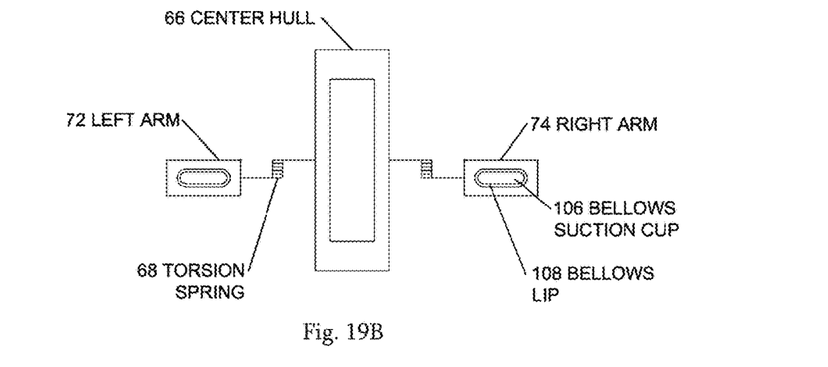
FIG. 19B—illustrates a top view of FIG. 19A in an unconfined state.
Figure 19C:
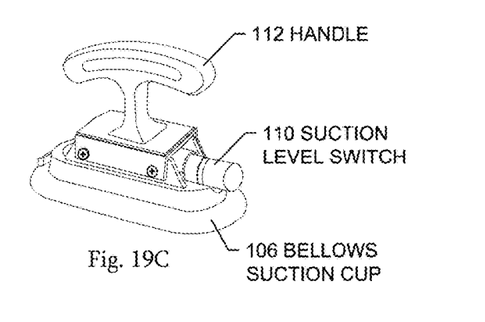
FIG. 19C—illustrates an embodiment of a bellow suction cup and handle.
Figure 19D:
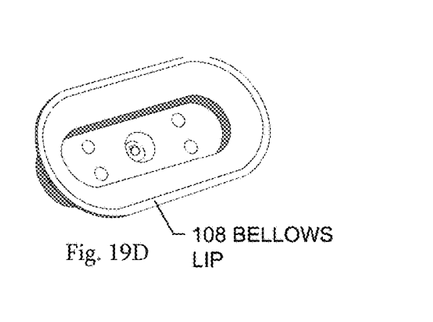
FIG. 19D—illustrates an embodiment of a bellow lip.

FIGS. 17 and 18 illustrate two exemplary embodiments of the pipe setting device 18. As shown, the preferred pipe setting device 18 comprises a center hull 66 and a hollow tube 98. The hollow tube 98 houses electronic components for monitoring the slope, elevation and orientation of the pipe being installed. Typically, the electronic components would include a two-dimensional sensor, a magnetic compass, a single board computer processor, a SD memory card, a WIFI transmitter/receiver and a battery. In addition, a mobile device would be wirelessly connected to one or more of the electronic components in order to remotely monitor the pipe installation in real time.

The preferred center hull 66 has a curved surface 92 for fitting against an inside surface 94 of a pipe. When the curved surface 92 is pressed against the inside surface of the pipe, it aligns the hollow tube 98 longitudinally with the pipe. In order to keep the curved surface 92 tight against the inside surface 94 of the pipe, it is preferred to connect a torsion spring 68 to the center hull 66. The purpose of the torsion spring 58 is to bias the center hull 66 against the top surface 94 (i.e., the pipe soffit) as shown in FIG. 17.

For smaller pipes, one torsion spring 68 can be sufficient. The single torsion spring 68 can be connected between the center hull and a bottom leg 70 and pre-compressed before inserting into the pipe. That way, when the torsion spring is released inside the pipe, it biases both the center hull 66 and the bottom leg 70 against the inside surface 94 of the pipe. The bottom leg 70 preferably has a curved surface 92 that matches the inside surface 94 just like the center hull 66.

As discussed in more detail below, more than one torsion spring 68 can be utilized to keep the center hull 66 against the top surface 94. For example, instead of a bottom leg 70, left and right arms (72, 74) can be used. If left and right arms (72, 74) are used, they each preferably have a curved surface 92 that matches the inside surface 94 just like the center hull 66. An adjustable bracket can also be used to adjust the distance between the center hull 66 and the bottom leg 70.

A pair of mounting brackets 96 connected to the center hull 66 are used to hold the ends of the hollow tube 98. Each bracket comprises a rotatable bearing 54. A pair of shafts 38 connect the hollow tube 98 to the rotatable bearings 54, which rotatably suspends the hollow tube 98 between the pair of mounting brackets 96. By connecting the hollow tube 98 only to the rotatable bearings 54, the hollow tube 98 can rotate along its longitudinal axis. Connecting a weight 34 to the bottom of the hollow tube enables the hollow tube 98 to center itself vertically. It is preferred to mount a second chamber 102 mounted to the hollow tube 98 and position the weight 34 inside the second chamber 102.

The invention enables pipe installation in accordance with the design plans and prevents unintended downward-upward and/or oblique alignments. The invention transmits real-time data to pipe installers, site superintendent, and the inspector showing that the pipe has been laid in the ground matching the design plans and records it for as-built plan prints. Excavation and installation can be adjusted based on the pipe setter's reading.

One object of this invention is to enforce construction quality that is required under conventional practice.

Another object of this invention is to minimize construction delays.

Another object of this invention is to reduce constructions and inspection costs.

Another object of this invention is to increase accuracy and certainty of pipe installment.

Another object of this invention is to mitigate risk of disputes that construction deviates from the contract.

Another object of this invention is to transmit in real time printed as built drawings.

Another object of this invention is a cost-effective, quality control tool used in conduit installation that can also transmit data for as-built plans in real time.

DETAILED DESCRIPTION OF THE PREFERRED EMBODIMENTS

A clear understanding of the key features of the invention references to the appended drawings that illustrate the method and system of the invention. It will be understood that such drawings depict preferred embodiments of the invention and, therefore, are not to be considered as limiting its scope regarding other embodiments that the invention is capable of contemplating.

The invention is embodied in a system for assisting pipe installation according to the design plans and provides as-built plans without the need of a third-party surveyor on site to validate every piece of pipe installed.

Figure 4A:
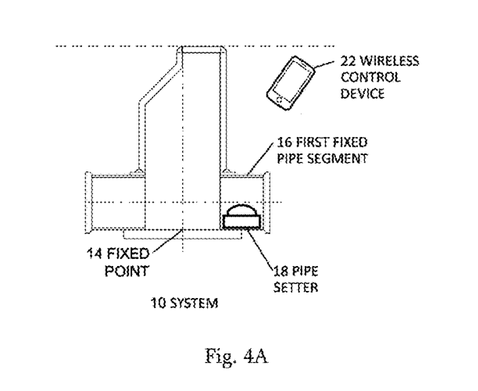
FIG. 4A—illustrates an embodiment of the pipe setting system layout for fixed point setting.
Figure 4B:
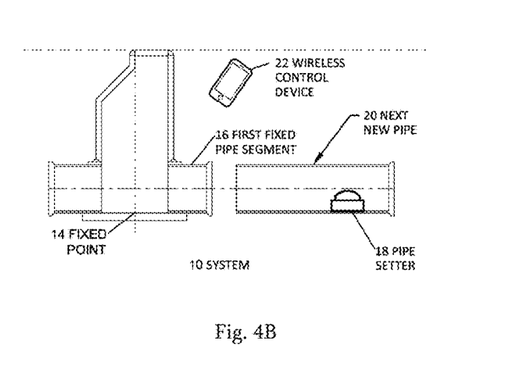
FIG. 4B—illustrates an embodiment of the pipe setting system layout for installing first new segment of pipe.
Figure 5:
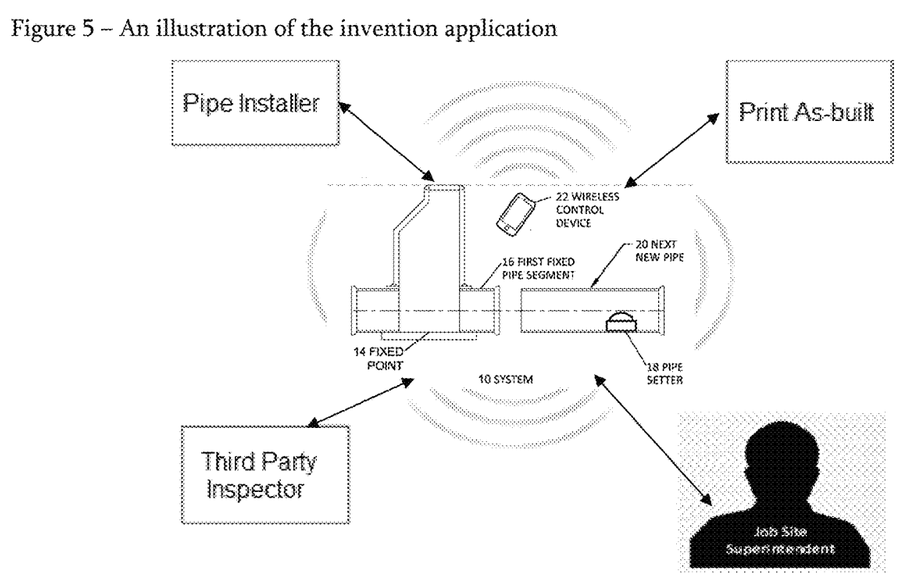
FIG. 5—illustrates a preferred application of the invention.

As shown in FIG. 4, the preferred system 10 comprises a pipe setter 18, and a wireless control device 22. A fix point 14 (x, y z coordinates surveyed) is used as a reference point for the new pipe to be installed. The fix point 14 is positioned to reference the first fixed pipe segment 16. The pipe setter 18 is positioned on the next new pipe 20 to be installed. The wireless control device 22 communicates with the pipe setter 18. The preferred purpose of the wireless control device is to remotely monitor data, process data and record as-built data.

The pipe setter 18 is a device comprising a mounting hull 26. The mounting hull 26 has four preferred embodiments (1) a two-piece mounting hull, (2) a three-piece mounting hull, (3) a two-piece extendable mounting hull, and (4) a three-piece mounting hull with bellow suction cup and handle. All four embodiments feature a center hull 66 that comprises a surface 92 with a curvature that matches the curvature of the inside surface 94 of the pipe being installed. Those in the art will recognize that the pipe setter 18 can work without curved surface 92; but it is preferred.

Figure 6:
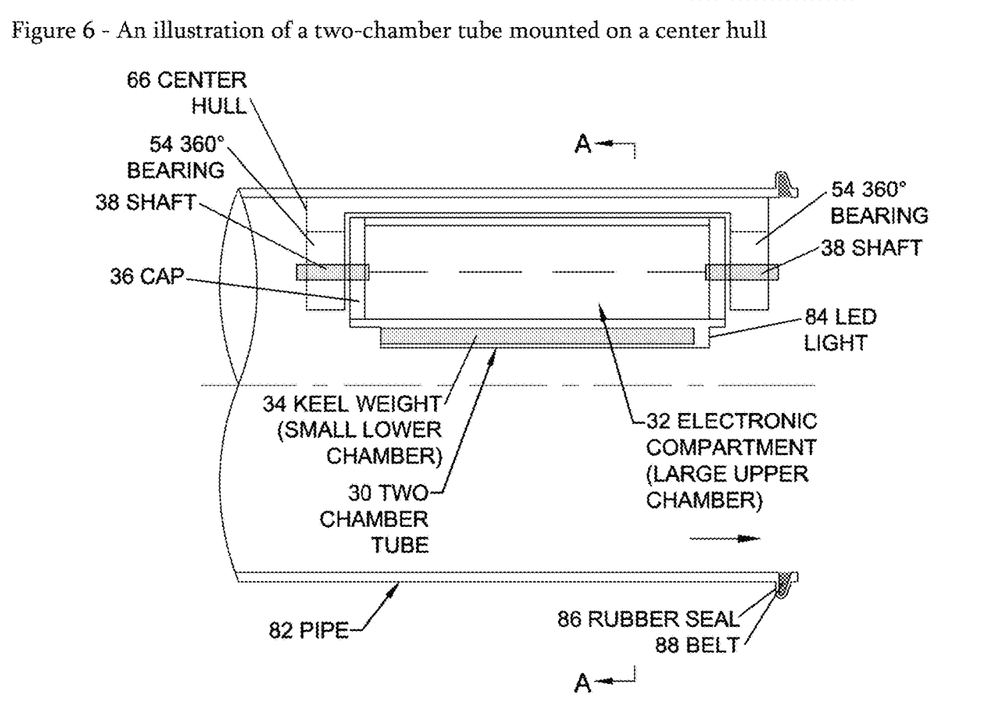
FIG. 6—illustrates an embodiment of a two-chamber tube mounted on a center hull.
Figure 7:
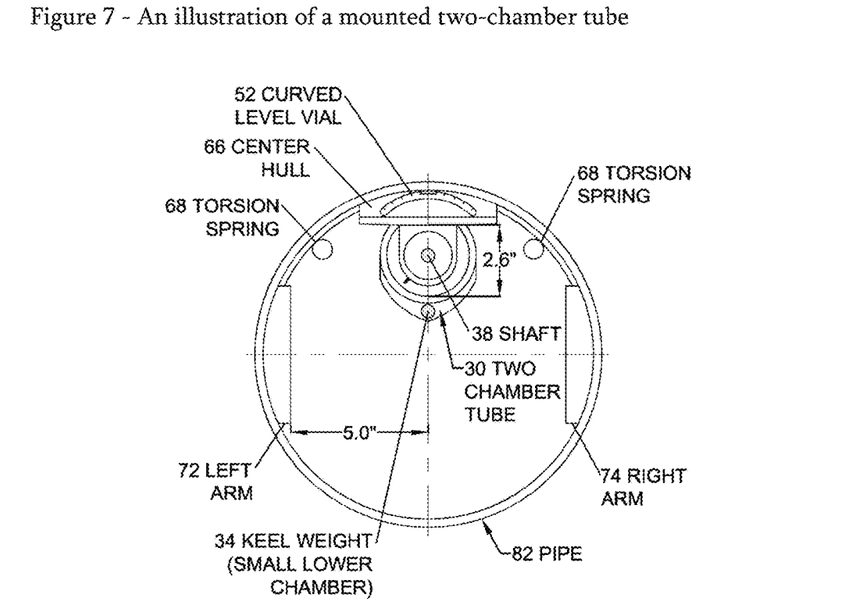
FIG. 7—illustrates an end view a two-chamber tube mounted inside a pipe.

All four embodiments of the mounting hull 26 feature a center hull 66 (FIGS. 6 and 7). A pair of mounting brackets 96 are connected to the center hull 66. Each mounting bracket 96 comprises a rotatable bearing 54. A hollow tube 98 for housing electronic components is suspended between the pair of mounting brackets 96 by a pair of shafts 38. By connecting the hollow tube 98 to the rotatable bearings 54, the hollow tube 98 can rotate along its longitudinal axis. Connecting a weight 34 to the hollow tube enables the hollow to center itself in a vertical orientation. It is preferred that the hollow tube 98 has a circular cross-section, but other cross-sections could also work.

Optionally, a curved level vial 52 can be inserted in the front face of the center hull 66 for verification of whether the center hull is mounted to the soffit of the conduit.

Figure 8:
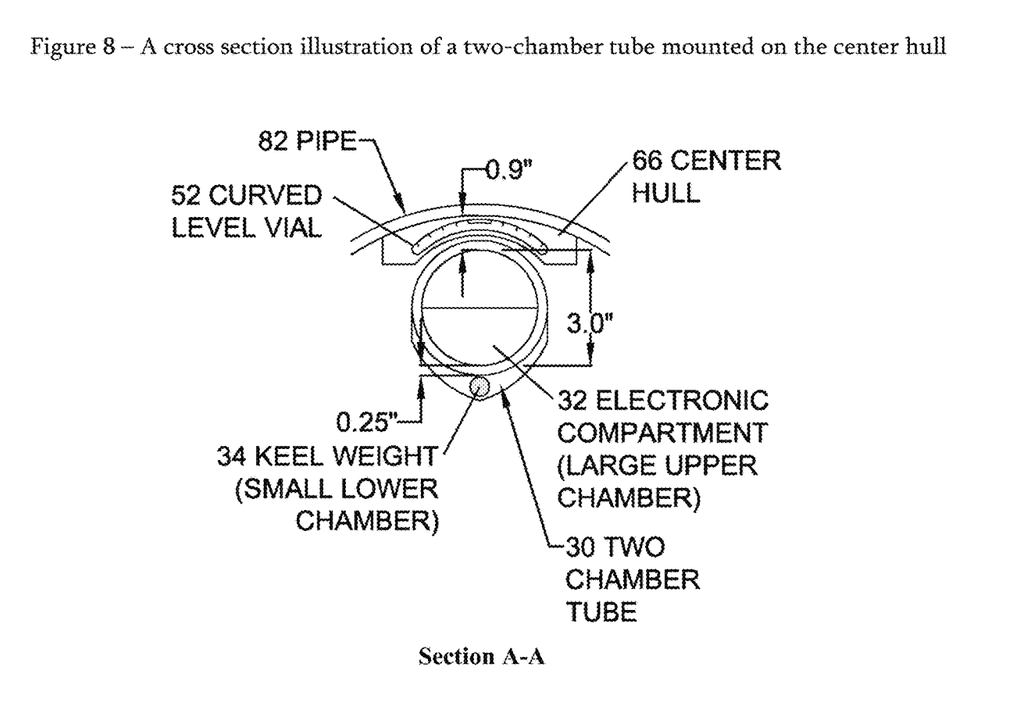
FIG. 8—illustrates section A-A of FIG. 6.

It is preferred to mount a second (or lower) chamber 102 to the hollow tube 98 and position the weight 34 inside the second chamber. This two-chamber embodiment is the preferred embodiment of the hollow tube 98 and this embodiment is referred to herein as a "two-chamber tube" 30. The two-chamber tube 30 (FIGS. 6, 7, and 8) can be manufactured in many ways known in the art. The preferred way is to use an injection molded transparent plastic that includes a large hollow tube 98 (for housing the electronic compartment 32) and a small second chamber 102 (for housing the keel weight 34).

The hollow tube 98 can be longer than the second chamber 102. At each end of the hollow tube 98 is a cap 36. The cap 36 preferably has a center hole for receiving a shaft 38. The shaft 38 can mate with the center hole via a threaded connection, but other connections known in the art would be suitable. The cap 36 itself preferably mates with the end of the tube 98 via a threaded connection (or other suitable connection) to seal the hollow tube 98 externally.

The shaft 38 protrudes from the cap 36 and can be received by bearing 54. As shown in FIG. 17, the hollow tube 98 is rotatably supported on either end by the pair of bearings 54 and is free to rotate about its longitudinal axis. Adding keel weight 34 to the hollow tube enables the hollow tube 98 to center itself in the vertical direction. The free rotation of the 360° bearings 54 enable the paralleling of the longitudinal axis of the hollow tube 98 (or two-chamber tube 30) to the longitudinal axis of the installing pipe when the center hull 66 is mounted in the vicinity of the pipe soffit 104 and aligned with the bell/rubber seal 86 (inner side of the pipe apex).

An instrument board 80 with a width preferably equal to the inside diameter of the large upper chamber is inserted inside the hollow tube 98 forming the electronic compartment 32 (FIGS. 9 and 10) that houses (1) a two-axis tilt sensor 40, (2) a digital magnetic compass 36, (3) a single board miniature computer 46, (4) SD memory card, (5) a Wi-Fi module, (6) a LED light 84, and (7) a battery 50.

Figure 9:
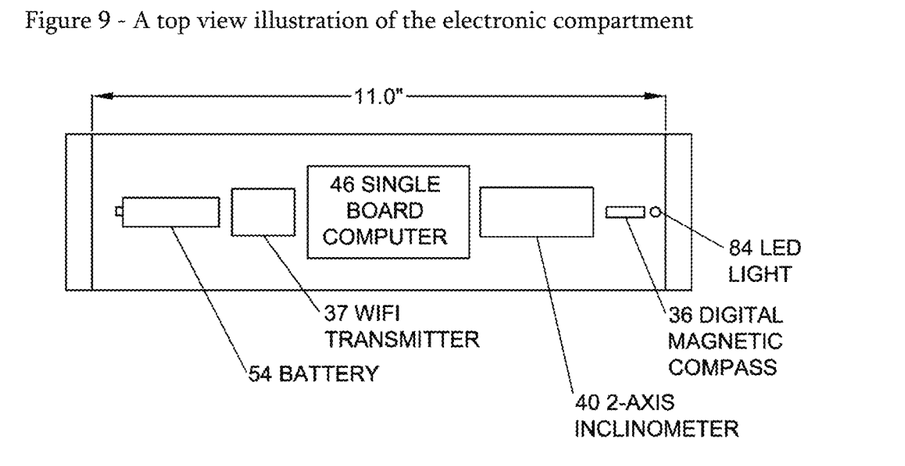
FIG. 9—illustrates a top view illustration of the electronic compartment.
Figure 10:
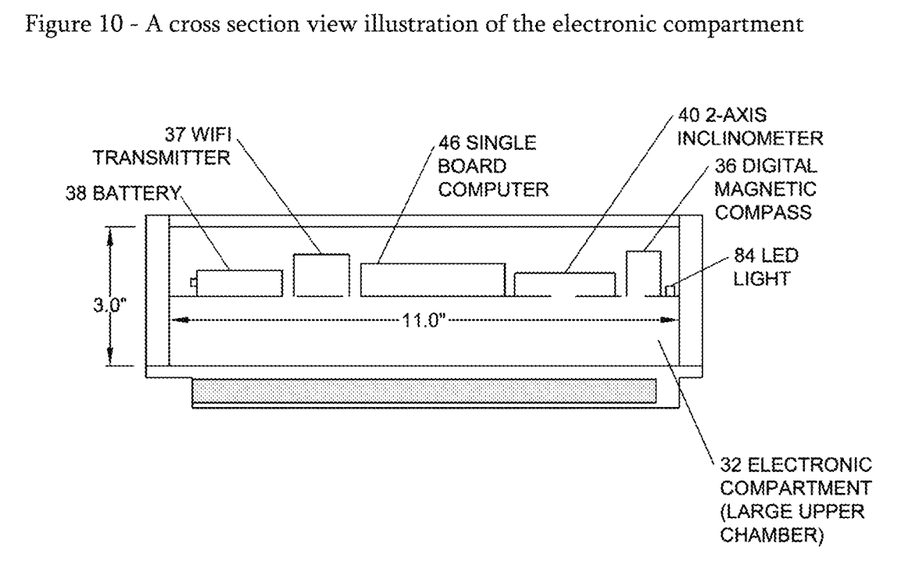
FIG. 10—illustrates a cross-section view of the electronic compartment.

The purpose of the 2-axis inclinometer 40 is to measure the longitudinal inclination. The 2-axis inclinometer's measuring range should be less than 3 degrees (0 to 5.45% slope) with accuracy meeting the design and construction requirements.

The purpose of the digital compass is to read the angle of the next new pipe 20. In addition, any differences in readings on consecutively laid pipes can also indicate the connecting pipe's horizontal deflection, if any.

The single board computer 46 and the SD memory card provide the following: (1) it can enable the user to input requirements per the construction drawings, (2) it can guide the installer to lay and set the pipe according to the input construction drawing, (3) it can record the installing sequence, longitudinal slopes and horizontal deflection angles for each pipe installed and sends the data to the wireless handheld devices, and (4) it can provide data download for plotting plans and profiles of the pipes laid, printing summary tables and identifying any deviations that does not meet the required construction accuracy.

The purpose of the Wi-Fi module is to transfer data collected, including pipe laying sequences, slope, geometric angles to the wireless control device 22 that can track and later used for plotting a pipe's as-built plan.

The LED light is under the instrument board 80 and can emit six different color light signals through the lower chamber and in front of the keel weight 34.

The mounting hull 26 is a device that will hold the pipe setter systems in place in a specific pipe size. The center hull 66 can be interchangeable between different embodiments of the mounting hull 26 to accommodate different pipe sizes for the same instrument compartment.

The mounting hull 26 features a mechanism that biases the pipe setter 18 against the interior of the pipe to be installed. The mounting hull 26 of the invention has four preferred embodiments: (1) a two-piece embodiment for smaller pipes (FIG. 11), (2) a three-piece embodiment for mid-size pipes (FIG. 12), (3) a two-piece extendable embodiment for large pipes (FIG. 13) and (4) a three-piece mounting hull with bellow suction cup and handle (FIG. 19A-D).

In general, all preferred embodiments of the mounting hull 26 (for various pipe sizes) feature a center hull 66 that has a curved bottom matching the interior curvature of the laying pipe and a flat deck with carved hollow center for the installation of two 360° bearings 54. It is preferred to make the mounting hull 26 out of plastic, but other suitable materials would work. For example, it is preferred to make plastic bases by molding each along the curvature of the target pipe or by 3-D printing.

Figure 11A:
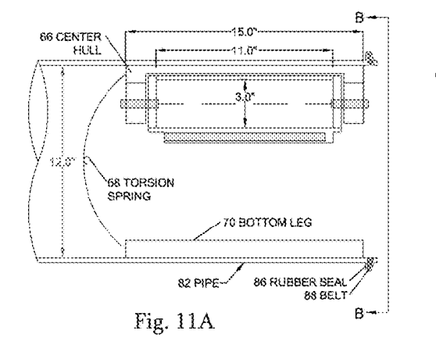
FIG. 11A—illustrates a section view of preferred embodiment for a two-piece mounting hull for smaller pipes.
Figure 11B:
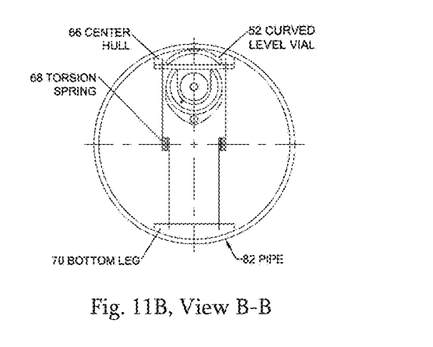
FIG. 11B—illustrates end view B-B from FIG. 11A.

FIG. 11 illustrates the preferred embodiment of a two-piece mounting hull 62. The preferred use of the two-piece mounting hull 62 is for smaller diameter pipes. The two-piece mounting hull includes a center hull 66 and a bottom leg 70 that are connected with a torsion spring 68. These three parts (hull, leg and spring) can be bended inward to fit inside a pipe. When released inside the pipe, the torsion spring 68 exerts force on the hull 66 and bottom leg 70, which biases them against the inside face 94 of the pipe. In addition, the curvature of the center hull 66 and bottom leg 70 help orient the mounting hull 26 along the longitudinal axis of the pipe. For this reason, it is preferred that the bottom leg 70 have a similar shape and material as center hull 66 but without an electronic compartment 58.

Typically, a smaller diameter pipe would be any pipe less than 12". In operation, the torsion spring 68 biases the bottom leg 70 against the bottom interior surface of the pipe and center hull 66 against the top of the pipe. It is preferred to use two 90° torsion springs 68 as shown, but one could be suitable.

Figure 12A:
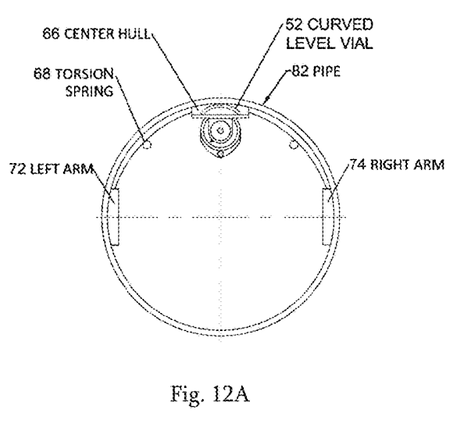
FIG. 12A—illustrates an end view of the preferred three-piece extendable mounting hull for mid-size pipes installed inside a pipe.
Figure 12B:
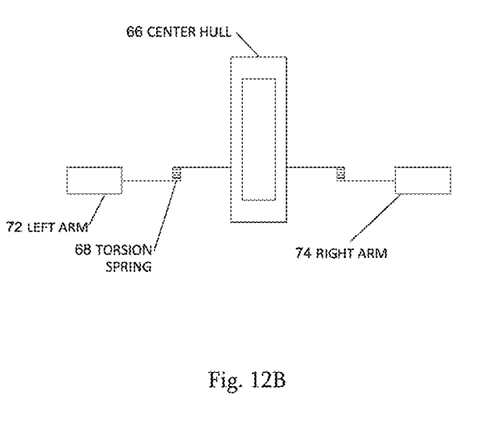
FIG. 12B—illustrates a top view of the preferred three-piece extendable mounting hull for mid-size pipes in an unconfined state.
Figure 12C:
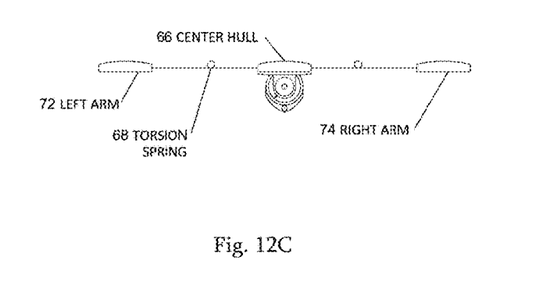
FIG. 12C—illustrates an end view of the preferred three-piece extendable mounting hull for mid-size pipes in an unconfined state.

FIG. 12 illustrates the preferred embodiment of a three-piece mounting hull 64. The preferred use of the three-piece mounting hull 64 is for mid-size diameter pipes. Typically, a mid-size diameter pipe would have a diameter between 12" and 30". The three-piece mounting hull 64 comprises a center hull 66, a left arm 72, a right arm 74 and at least two torsion springs 68. The two torsion springs 68 bias the left and right arms 72, 74, as well as the center hull 66, against the left, right and top inside face of the pipe 82 respectively.

The left arm and the right arm have a similar shape and material as center hull 66 but with no electronic compartment 58.

Figure 13A:
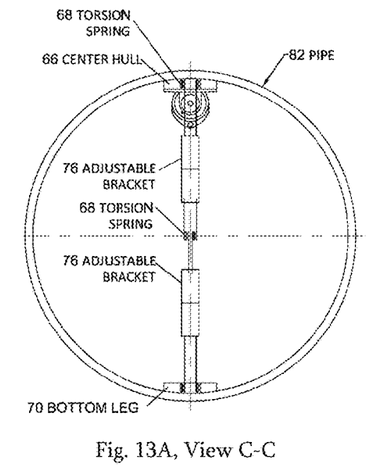
FIG. 13A—illustrates end view C-C of FIG. 13B.
Figure 13B:
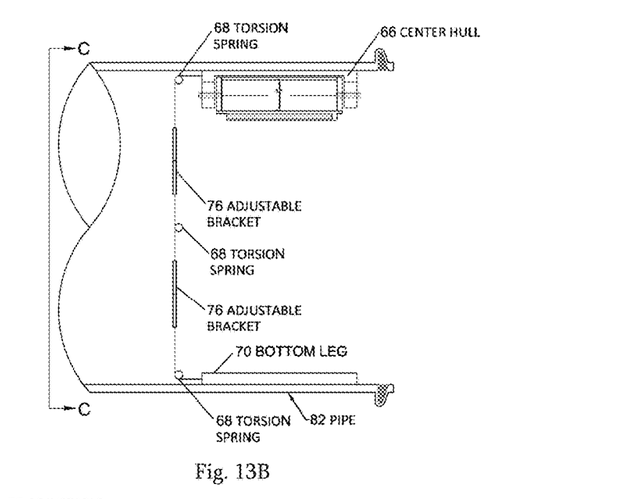
FIG. 13B—illustrates a section view of the preferred two-piece extendable mounting hull for large pipes installed inside a pipe.
Figure 13C:
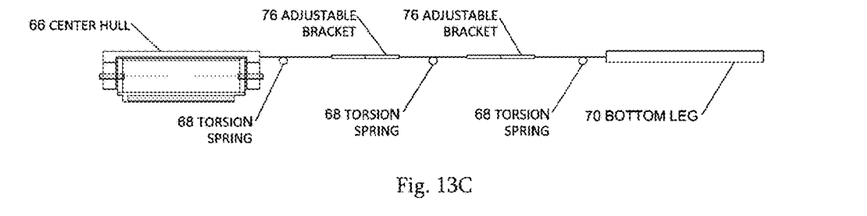
FIG. 13C—illustrates a side view of the preferred two-piece extendable mounting hull for large pipes in an unconfined state.

FIG. 13 illustrates the preferred embodiment of a two-piece extendable mounting hull 60. The preferred use of the two-piece extended mounting hull 60 is for larger diameter pipes. Typically, a larger diameter pipe would have a diameter greater than 30". As shown in FIG. 13A-C, the two-piece extended mounting hull 94 comprises a center hull 66, an adjustable bracket 76, a bottom leg 70 and torsion springs 68. It is preferred to use three pairs of torsion springs 68 as shown. Also, it is preferred to use two adjustable brackets 76 in between the torsion springs 74 as shown. The torsion springs 68 bias the center hull 66 against the top inside face of the pipe 82 and the torsion springs bias the bottom leg 70 against the bottom of the inside face of the pipe 82 respectively. The torsion springs 68 are preferably helical 180-degree torsion springs through the mid-section holes. The bottom leg has a similar shape and material as center hull 66 but with no electronic compartment. The adjustable brackets 76 is made of two adjustable bracket 1206 (FIG. 14), which can be extended.

FIG. 19 illustrates the preferred embodiment of a three-piece mounting hull with bellows suction cup and handle. It can be used for pipe diameters larger than 10". The three-piece mounting hull with bellows suction cup and handle is an enhanced version of the three-piece mounting hull, with a bellow suction cup 106 and handle 112 added to the left arm and right arm where the curved surfaces 92 are carved for housing the bellow suction cup. The bellows lip 108 matches the pipe's inner surface. The vacuum suction and release can be activated by pressing and releasing the suction level switch 110.

Figure 14A:
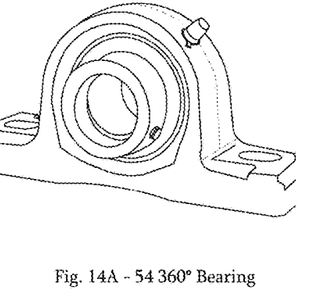
FIG. 14—illustrates the 2-chamber tube mounting accessories.
Figure 14B:
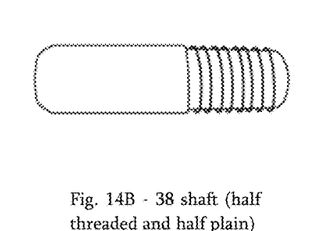
Figure 14C:
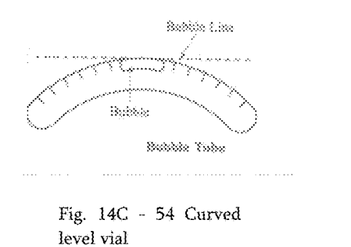

The legs 78 of the torsion spring 74 can be threaded or plain no-thread legs. Threaded legs 78 can be connected or terminated by hex couplers. Plain no-thread legs 78 can have set screw coupling for connection or terminations.

The combination of the torsion exerted by the twisted torsion springs 68 and the matched curvature of each base to the pipe's interior curvature allows the pipe setter 18 to be easily mounted and dismounted from a pipe in a secure fashion. The torsion springs 68 bias the pipe setter 18 against the interior sides of the pipe 82 to hold the device in place.

The wireless control device 22 can provide remote processing and recording. The control device 22 could be a cell phone, a dedicated radio frequency (RF) controller, and/or another wireless device with a processor and recording unit (SD card).

Preferred Operation

In lieu of the prior art practice of setting up an independent off-the-line laser guide for conduit construction (see FIG. 3), a surveyed fix point 14 is tied to the pipe setter 18 placed inside the first fixed pipe segment 16. (See FIG. 4)

A surveyed fix point 14 is the basis to configure the geometry of the first installed pipe 16, which a pipe setter 18 is placed in the pipe 16 for the verification and confirmation on the line and grade of the first pipe installed. Likewise, the same establishment applies to continue the pipe installation from the last pipe installed previously.

Before the pipe setter 18 is placed into a consecutive pipe segment 20, it must be programmed by entering the ending station number (whether higher or lower), the design plan slope, the pipe length, and horizontal deflection angle of pipe joints and stations (if applicable) into the on board computer 46 in the electronic compartment 32 through the wireless control device 22.

Data Entry
(1) To begin the operation, the pipe setter 18 must start from a surveyed fixed point that can tie to the new pipe to be installed.
(2) Enter the starting elevation of the surveyed fix point 14.
(3) Enter the starting station as shown on the design plan for the fix point and/or last completed pipe segment.
(4) Enter whether the new pipe station is of decreasing or increasing stationing from the fix point and or last installed pipe segment's station.
(5) Enter pipe manufacture length (installed from match marks)
(6) Enter the design pipe slope.
(7) Enter horizontal deflection angle of pipe joints and stations if any.

Installing the Pipe Setter

Figure 15A:
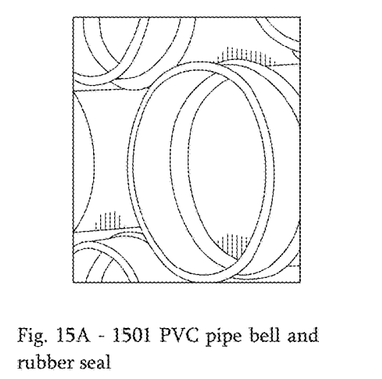
FIG. 15—illustrates mounting hull accessories.
Figure 15B:
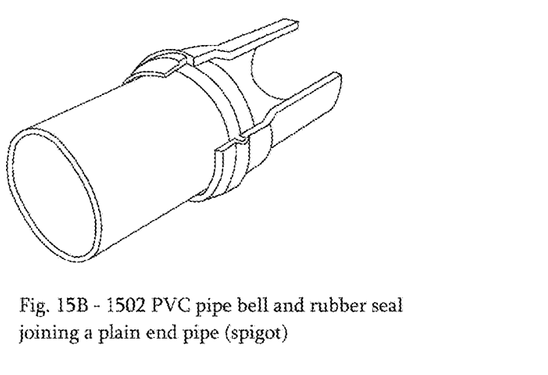
Figure 16A:
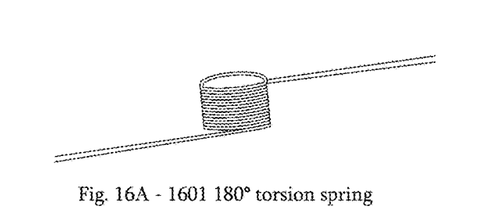
FIG. 16—illustrates mounting hull accessories.
Figure 16B:
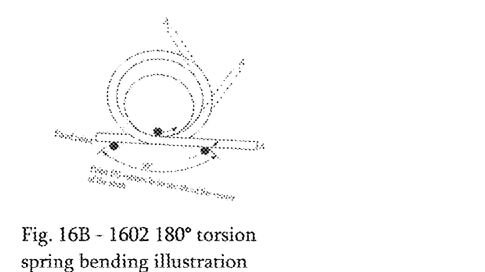
Figure 16C:
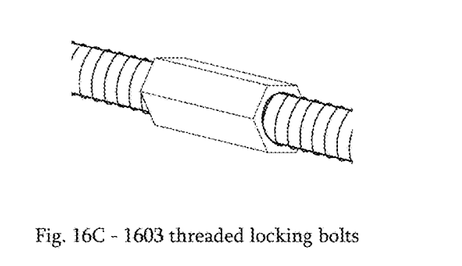
Figure 16D:
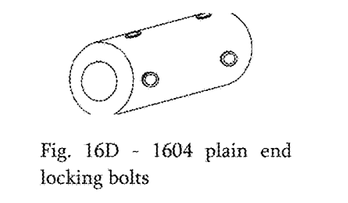
Figure 16E:
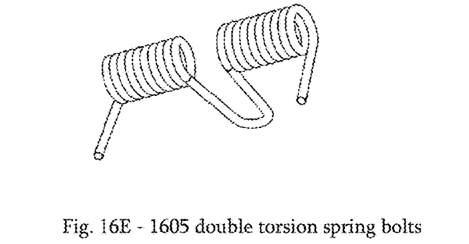
Figure 16F:
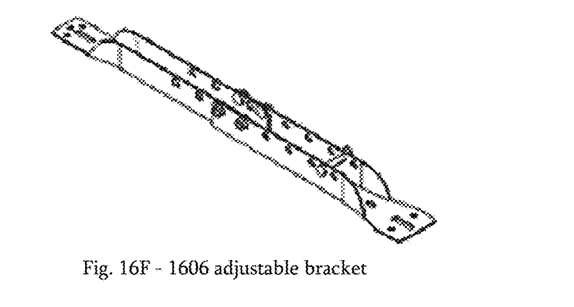

By way of example, to install the three-piece mounting hull 78, a user would turn the left and right arms 72, 74 of the setter 18 downward and pinch/pull towards the center hull 66. Then a user would insert the setter 18 into the pipe 82 beyond and next to the rubber seal 86 (FIG. 15. 1501 and 1502) with the curved level vial 54 lining up against the pipe soffit and release the setter mounting arms against the interior surface pipe 82.

The 360° bearing 54 and the keel weight enables the two chamber tube 30 align with the pipe 82. The 2-axis inclinometer's longitudinal reading would be the slope of the pipe invert when the horizontal reading is level and not in any motion.

The LED light 84 can emit five different color light signaling the status of the pipe to the pipe installer.

A flashing red color indicates the pipe slope is steeper than the target slope. An upward adjusting height in two digits decimals inches also being transmitted to the wireless control device 22.

A flashing yellow color indicates the pipe slope is milder than the target slope. A downward adjusting height in two digits decimals inches also being transmitted to the wireless control device 22.

A flashing blue color indicates the pipe is tilted to the left. A right adjusting distance in two digits decimals inches also being transmitted to the wireless control device 22.

A flashing purple color indicates the pipe is tilted to the right. A left adjusting distance in two digits decimals inches also being transmitted to the wireless control device 22.

During the pipe set up, the two chamber tube is not motionless, the on-board program calculated longitudinal slope remains constant with the oscillation. If the longitudinal slope remains constant, a flashing green color indicates the pipe is set correctly.

Once the two-chamber tube is motionless and a confirmation of data received from the wireless control device, the LED light turns to non-flashing green light.

Computing an As-Built Plan

Data is stored on the computer 46 in the pipe setter 18 and transmitted to the wireless control device 22 or off site. Wherever it is, the data can be downloaded for CADD plotting and used for comparison against the design plan.

The mobile device 22 can be a mobile phone and/or a wireless unit that is programmed to accept both the target line and grade per design plan and the field data. The stored construction data can be downloaded for CADD plotting for the as-built plan preparation. Data can then be shared with the construction superintendent and the owner's engineer.

Benefits

The invention provides a construction quality control tool that allows owners and contractors to meet design plans and specifications.

Easy Mounting and Removing

It saves time and costs to both parties' budgets by easily measuring pipe grading while eliminating the need for surveyors on site and quickly transmitting print data in real time for third-party inspectors to prepare as-built plans. The saving in labor cost is around $50,000 per mile for installing one mile of sewer line should the contractor follows the design and construction specifications.

While the invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention.

What is claimed is:

1. A pipe setting device for underground conduit construction comprising:
    a center hull, the center hull comprising a curved surface for fitting against an inside surface of a pipe,
    a pair of mounting brackets connected to the center hull, each mounting bracket comprising a rotatable bearing,
    a hollow tube for housing electronic components, the hollow tube suspended between the pair of mounting brackets by a pair of shafts connecting the hollow tube to the rotatable bearings, wherein the rotatable bearings allow the hollow tube to rotate along a longitudinal axis, and,
    a weight connected to the hollow tube for centering the tube in a vertical orientation.

2. The pipe setting device of claim 1, the hollow tube comprising electronic components selected from a group comprising a two-dimensional sensor, a magnetic compass, a single board computer processor, an SD memory card, a WIFI transmitter/receiver and a battery.

3. The pipe setting device of claim 1 further comprising a mobile device for remote data communication with one or more of the electronic components.

4. The pipe setting device of claim 1 further comprising a chamber mounted to the hollow tube, the second chamber comprising the weight.

5. The pipe setting device of claim 1 further comprising a first torsion spring connected to the center hull for biasing the top curved surface against the inside surface.

6. The pipe setting device of claim 5 further comprising a bottom leg, the bottom leg connected to an end of the first torsion spring.

7. The pipe setting device of claim 5 further comprising a second torsion spring, an adjustable bracket, and a bottom leg, the first torsion spring connected to the adjustable bracket, and the second torsion spring connected between the adjustable bracket and the bottom leg.

8. The pipe setting device of claim 1 further comprising a left arm, a first torsion spring, a right arm, and a second torsion spring, the first torsion spring connected between the center hull and the left arm and the second torsion spring connected between the center hull and the right arm.

\* \* \* \* \*